UNITED STATES PATENT OFFICE.

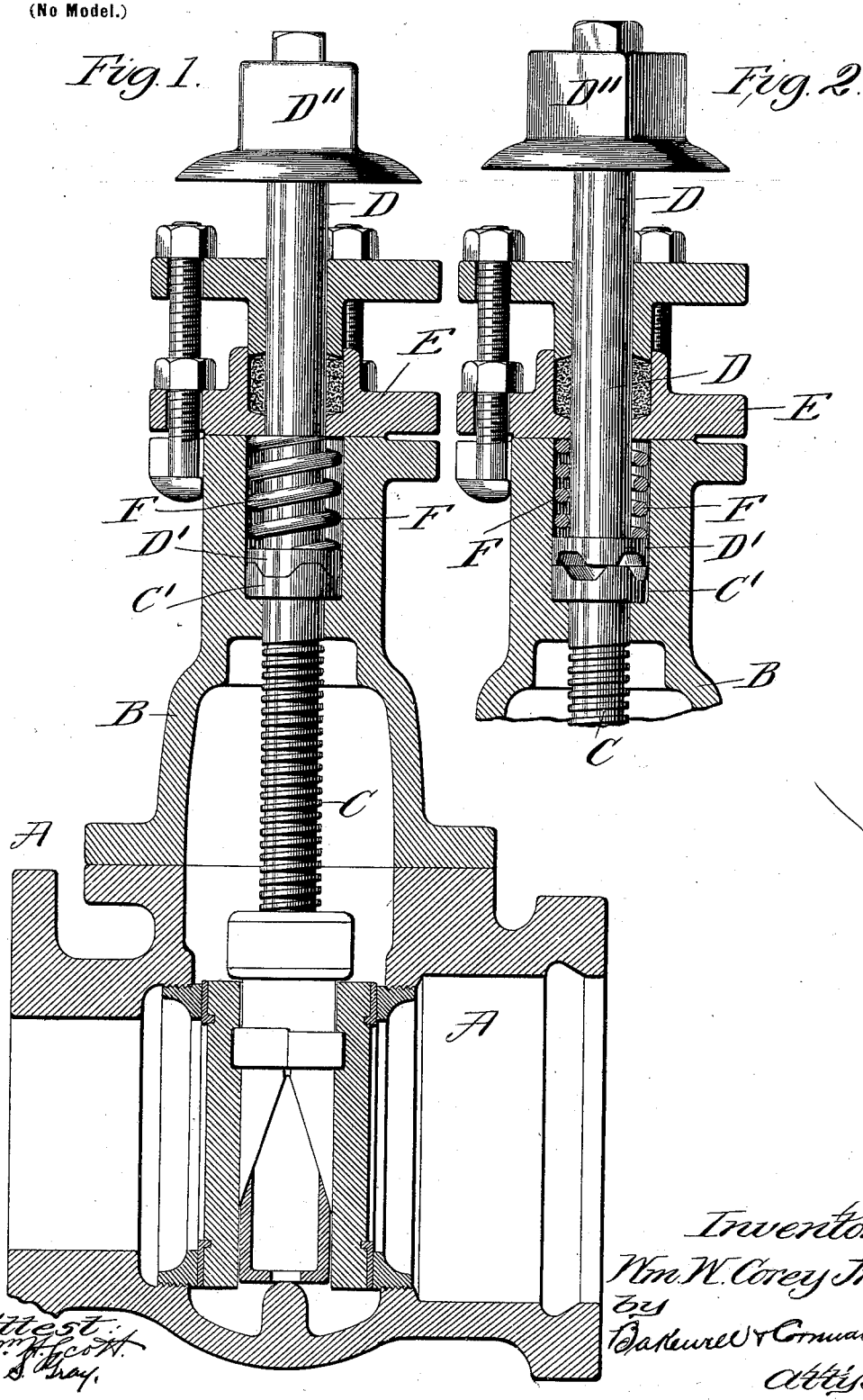

WILLIAM W. COREY, JR., OF ST. LOUIS, MISSOURI.

SAFETY ATTACHMENT FOR VALVE-STEMS.

SPECIFICATION forming part of Letters Patent No. 622,912, dated April 11, 1899.

Application filed January 11, 1899. Serial No. 701,802. (No model.)

*To all whom it may concern:*

Be it known that I, WILLIAM W. COREY, Jr., a citizen of the United States, residing at the city of St. Louis, State of Missouri, have invented a certain new and useful Improvement in Safety Attachments for Valve-Stems, of which the following is a full, clear, and exact description, such as will enable others skilled in the art to which it appertains to make and use the same, reference being had to the accompanying drawings, forming part of this specification, in which—

Figure 1 is a vertical sectional view of a gate-valve, illustrating my improvement in position on the stem thereof. Fig. 2 is a similar view showing the manner in which my safety attachment to the valve-stem operates when the valve meets with an obstruction.

This invention relates to a new and useful improvement in safety attachments to valve-stems, the object being to provide a valve-stem with means whereby when the valve is operated by an inexperienced person who attempts to rotate the stem in the wrong direction either in the opening or closing movement, or when the valve meets with an obstruction, such as a stone or gravel, as a valve located in a water-main, the stem can be independently rotated without danger of breaking any of the parts of the valve.

The essential features of this invention reside in constructing the valve-stem of two independently-rotatable parts having contiguous friction-faces normally held together by yielding means whose energy is sufficient under ordinary conditions to hold the two parts of the stem in a locked position, but which means in the event that the valve meets with an obstruction will yield, permitting one part of the stem to rotate independently of the other part of the stem, thereby preventing sufficient power being applied to that part of the valve-stem directly connected to the valve to break the valve or its associate parts.

Other features reside in the novel construction, arrangement, and combination of the several parts, all as will hereinafter be described, and afterward pointed out in the claims.

In the drawings, A indicates an ordinary gate-valve, comprising, as usual, a suitable valve-casing, valve-seats, and valve proper, the details of which parts not entering into my invention and not being claimed here will not be further described.

B indicates a housing, forming practically a part of the valve-casing, in which is mounted a valve-stem C (shown in the drawings as consisting of a threaded portion) and a head C', whereby when said stem is rotated said valve is elevated.

D indicates the other portion of the valve-stem, which is rotatable independently of the portion C, said stem D having a head D' on its lower end to coöperate with the head C' of the portion C of said valve-stem.

E indicates a cap or follower-plate whose function is to afford a seat for the upper end of a spring F, whose other end bears against the head D' and tends at all times to hold said head in engagement with the head C'. On the upper end of stem D is a non-circular head D'', with which a suitable wrench is adapted to coöperate to rotate said stem.

In the drawings I have also shown a stuffing-box through which stem D passes; but it is obvious that this can be dispensed with in other forms of valves to which my invention is equally applicable.

The engaging faces of heads C' and D' are formed with converse parts snugly matching each other. These matching faces may be curved or wavy lines in external appearance, the ridges and valleys of corresponding shape radiating from the axis of rotation. As shown in the drawings, these faces may be inclined on both sides, so as to permit the head D' to ride over the head C' in either direction. It is also obvious that where it is desired to prevent the improper rotation of the valve-stem in only one direction ordinary ratchet-teeth can be employed.

The operation of my improved safety attachment to valve-stems is as follows: Assuming the valve to be in the position shown in Fig. 1, the rotation of the stem to the right will cause said valve to rise, and if for any reason, such as the presence of rust or corrosion, the valve should stick so tight as to offer sufficient resistance to strip the threads on rod C, which would thereby render the valve wholly inoperative, the spring F would yield to this greater resistance and permit the head D' to ride over the head C'. In such in-